US008189467B2

United States Patent
Song et al.

(10) Patent No.: US 8,189,467 B2
(45) Date of Patent: May 29, 2012

(54) NETWORK RESOURCE CONTROL METHOD AND APPARATUS FOR GUARANTEEING ADMISSION RATE OF HIGH-PRIORITY SERVICE

(75) Inventors: Jongtae Song, Daejeon (KR); Soon Seok Lee, Daejeon (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 53 days.

(21) Appl. No.: 12/540,687

(22) Filed: Aug. 13, 2009

(65) Prior Publication Data

US 2010/0131325 A1 May 27, 2010

(30) Foreign Application Priority Data

Nov. 27, 2008 (KR) ........................ 10-2008-0119012

(51) Int. Cl.
H04J 3/16 (2006.01)
(52) U.S. Cl. ........................................ 370/230; 370/235
(58) Field of Classification Search ................. 370/412, 370/230, 229, 252; 709/228, 226
See application file for complete search history.

(56) References Cited

U.S. PATENT DOCUMENTS

| | | | |
|---|---|---|---|
| 2002/0188732 A1* | 12/2002 | Buckman et al. | 709/228 |
| 2004/0028054 A1 | 2/2004 | Khurana et al. | |
| 2004/0131013 A1* | 7/2004 | Ise et al. | 370/229 |
| 2006/0171315 A1* | 8/2006 | Choi et al. | 370/230 |
| 2007/0180119 A1* | 8/2007 | Khivesara et al. | 709/226 |
| 2009/0141732 A1* | 6/2009 | Woo et al. | 370/412 |
| 2009/0316578 A1* | 12/2009 | Mang et al. | 370/230 |
| 2010/0017529 A1* | 1/2010 | Takacs et al. | 709/231 |
| 2011/0199932 A1* | 8/2011 | Short et al. | 370/252 |

FOREIGN PATENT DOCUMENTS

| | | |
|---|---|---|
| KR | 1020080006596 A | 1/2008 |
| WO | 2007/100495 A1 | 9/2007 |

* cited by examiner

*Primary Examiner* — Kwang B Yao
*Assistant Examiner* — Syed M Bokhari
(74) *Attorney, Agent, or Firm* — Ladas & Parry LLP

(57) ABSTRACT

Provided are a network resource control method and apparatus for guaranteeing an admission rate of a high-priority service. In the method and apparatus, the admission rate of the high-priority service is increased by differentiating between the high-priority service and a low-priority service by either rejecting the low-priority service or reducing a bandwidth allocated to the low-priority service when the low-priority service has already been accepted.

14 Claims, 6 Drawing Sheets

NETWORK RESOURCE CONTROL METHOD AND APPARATUS FOR GUARANTEEING ADMISSION RATE OF HIGH-PRIORITY SERVICE

CROSS-REFERENCE TO RELATED PATENT APPLICATION

This application claims the benefit of Korean Patent Application No. 10-2008-0119012, filed on Nov. 27, 2008, in the Korean Intellectual Property Office, the disclosure of which is incorporated herein in its entirety by reference.

BACKGROUND OF THE INVENTION

1. Field of the Invention

The present invention relates to a resource control system and method, and more particularly, to a next generation network resource control method and apparatus for preventing a high-priority service from having relative disadvantages while allocating network resources to various-level services, and guaranteeing a high admission rate of the high-priority service.

2. Description of the Related Art

Conventionally, when a request for a service is received, it is determined whether to accept the request according to the current state of a network and by using resource control functions. In this case, the policies of a network service provider and a current resource state of the network are considered in order to determine whether to accept the request. If network resources are insufficient, the request is not accepted. That is, whether to accept the request is determined based on the current resource state of the network.

As such, a conflict occurs when requests for various-level services are accepted. That is, if a request to provide a high-priority service is received while a low-priority service uses all network resources, the request should be rejected in the network. Thus, a priority reversal that the request to provide the high-priority service is rejected because of the already accepted low-priority service happens.

A method of solving such a priority reversal has yet to be defined. Accordingly, there is a need to define a resource control system and process for preventing the priority reversal from occurring.

When providing Next-Generation Network (NGN) services, it is very important to consider priorities allocated to these services. For example, an emergency or disaster service should have priority over the other services from among the NGN services and thus be first considered when a request is received. However, it is difficult to differentiate a high-priority service from the other services by using a conventional technique when requests for various-level services are received.

SUMMARY OF THE INVENTION

The present invention provides a resource control method for guaranteeing a high admission rate of a high-priority service by rejecting a request for a low-priority service or by reducing a bandwidth allocated to an already accepted low-priority service when various-level services are supported.

Additional aspects or advantages of the present invention will be set in part in the description which follows and, in part, will be apparent from the description, or may be learned by practice of the presented embodiments of the present invention.

According to an aspect of the present invention, there is provided a network resource control method including receiving a request to allocate resources to a specific service by using a network controller, and determining whether to accept the request by controlling a bandwidth based on a maximum bandwidth determined according to each of a plurality of service levels.

According to another aspect of the present invention, there is provided a network resource control method including receiving a request to allocate resources to a specific service and checking available resources by using a network controller, determining whether the available resources are sufficient based on a service level of the specific service, and reducing a bandwidth allocated to an existing service in order to secure a bandwidth to be allocated to the specific service, and accepting the request, where a priority of the existing service is lower than a priority of the specific service.

According to another aspect of the present invention, there is provided a network resource control method performed by a network controller including receiving a request for a scalable video coding (SVC) service, and changing video resolution between high definition and low definition by increasing or reducing a bandwidth allocated to the SVC service.

According to another aspect of the present invention, there is provided a network resource control method including receiving a request to allocate resources to a specific service and checking available resources by using a network controller; and controlling an admission rate of the specific service by determining whether to accept the specific service based on a service level of the specific service.

According to another aspect of the present invention, there is provided a network resource admission control apparatus including a policy decision unit receiving a request to allocate resources to a specific service; and a resource delivery controller determining whether to accept the specific service by controlling a bandwidth based on a maximum bandwidth determined according to each of a plurality of service levels.

According to another aspect of the present invention, there is provided a network resource admission control apparatus including a policy decision unit inquiring available resources in response to a request to allocate resources to a specific service, secures a bandwidth to be allocated to the specific service by reducing a bandwidth allocated to a low-priority service whose priority is lower than a priority of the specific service when the available resources are not sufficient, and accepting the specific service; and a resource delivery controller determining whether the available resources are sufficient to be allocated to the specific service.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
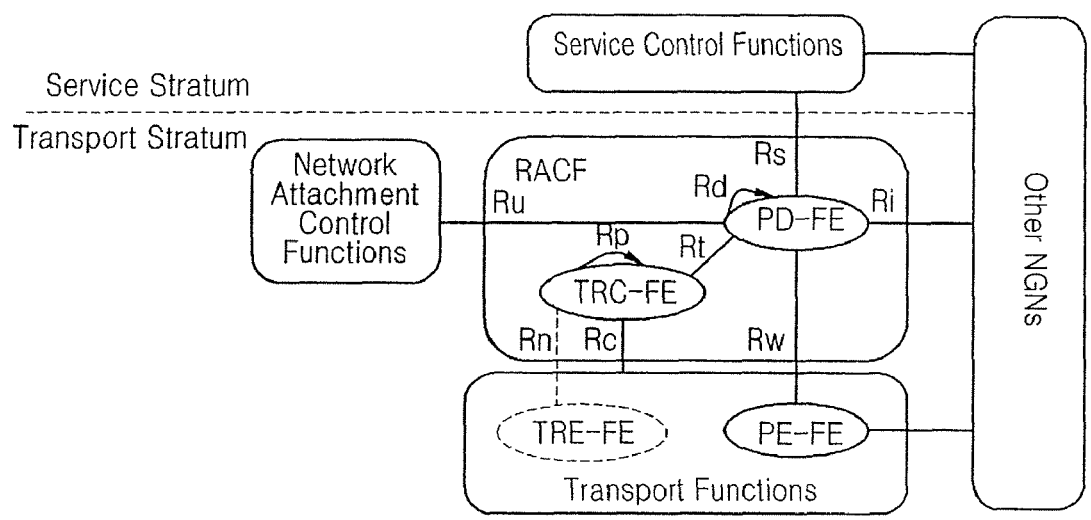
FIG. 1 illustrates a resource control system defined by the International Telecommunication Union-Telecommunication Standardization Sector (ITU-T)

Exemplary embodiments of the present invention will now be described more fully with reference to the accompanying drawings. Like reference numerals denote like elements throughout the drawings. In the following description, well-known functions or constructions are not described in detail if it is determined that they would obscure the invention due to unnecessary detail.

In this disclosure, when one element "includes" another element, it should be understood that the element may further include other elements unless otherwise defined. As used herein, a term, such as "unit", "device", "function", or "functional unit", denotes a unit for processing at least one function or operation and may be realized in a hardware manner, a software manner or a combination thereof.

The Resource and Admission Control Function (RACF), which has recently been supported by standardization organizations, such as the International Telecommunication Union-Telecommunication Standardization Sector (ITU-T), defines a control system for guaranteeing a bandwidth allocated to an edge node at a network boundary for media flow traffic in order to manage network resources and guarantee service quality.

As such, whether to accept a request for a service is determined according to a current resource state of a network, and a bandwidth allocated to the accepted service is guaranteed in the network until the service ends.

A resource control function checks the resources of the network, accepts the requested service when the resources are sufficient, and rejects a further request for another service when the resources are used up.

However, as defined in the ITU-T recommendation Y.2171, even services requesting the same network bandwidth may be classified according to importance. For example, high priority is assigned to 911 services, emergency services, and disaster services, and general telecommunication services may be classified into low-cost services and premium services according to service level. Thus, even services requesting the same network bandwidth may be classified according to service level and thus need to be differentiated from each other.

In the case of the RACF, the standards of which have been prescribed, a general process of processing a request to provide resources for every service is defined, but a process of controlling resources in an actual service environment including various-level services is not defined.

The RACF entity includes a Transport Resource Control-Functional Entity (TRC-FE) and a Policy Decision Functional Entity (PD-FE). The RACF entity may be embodied in various hardwares but is generally embodied as a server. A Service Control Function (SCF) entity performs call setup signaling and may be embodied as various servers, such as a simple application server or an Internet protocol Multimedia Subsystem (IMS).

FIG. 1 illustrates a resource control system defined by the ITU-T. Referring to FIG. 1, the resource control system is largely divided into a Service Control Function (SCF) entity, an RACF entity, and a transport function entity. The SCF entity performs signaling, e.g., Session Initiation Protocol (SIP) signaling, in order to set up a service. The RACF entity receives Internet Protocol (IP) information and information regarding a bandwidth necessary for a node sensed through signaling by using the SCF, and then determining whether to accept a request for the service. The transport function entity delivers a media flow packet by using bandwidth information of a media flow accepted through the RACF entity. The RACF entity is divided into a Policy Decision Functional Entity (PD-FE) that includes receiving a request for resources from the SCF entity and determining whether to accept the request, and a Transport Resource Control Functional Entity (TRC-FE).

In the SCF entity, IP flow information for connecting a source node and a destination node and information regarding a bandwidth necessary to provide the service are obtained through call set-up signaling, e.g., SIP signaling, in order to access the service, and network resources are requested through the PD-FE. In the PD-FE, it is determined whether to accept the request for the service by comparing a bandwidth required for the service with a bandwidth available in a network through the TRC-FE. A bandwidth being initially allocated to the accepted service is guaranteed for the duration of the service.

In the above resource control system, the SCF entity indicates an emergency or disaster service based on media priority information when it receives a request for resources. In this case, the emergency or disaster service can be processed prior to a request for general resource control which is waiting for its processing or a request for resource control which is requested simultaneously with the emergency or disaster service. However, when the network resources are used up for an already accepted service, it is difficult to provide not only an emergency service but also differential non-emergency services that are provided to the general public.

Accordingly, the present invention provides a resource control system for preventing the occurrence of a priority reversal whereby a request for a high-priority service is rejected because of an already accepted low-priority service. That is, the present invention provides a control process and system for preventing a request for a high-priority service, such as an emergency service, a disaster service, or a premium service, from being rejected, in order to guarantee the QoS (quality of service) in a Next-Generation Network (NGN).

The present invention suggests two methods: a preventive method and a service downgrade method. In the preventive method, a request for a low-priority service is previously rejected in order to prevent the priority reversal from occurring. In the service downgrade method, when a request for a high-priority service is to be rejected due to a bandwidth shortage, network resources are secured by reducing a bandwidth allocated to an already accepted low-priority service, and the request for the high-priority service is accepted.

Hereinafter, the two methods will be described in more detail.

Preventive Method

In the preventive method, an available range of all network bandwidths is predetermined according to each service level. When resource control is performed through the RACF, resource control information is processed through the TRC-FE. In the TRC-FE, it is determined whether to accept a request for a service according to the level of the service and a bandwidth that is currently used (current bandwidth). For example, assuming that a total bandwidth available for a service is 100 Mbps, an emergency service may be accepted until the current bandwidth becomes 100 Mbps, and a premium service and a basic service may be respectively accepted until the current bandwidth becomes 90 Mbps and 70 Mbps from among the general telecommunication services. That is, maximum available bandwidths Bmax_p, which is an upper limit of the current bandwidth for allowing a p-level service, of the emergency service, the premium service and the basic service are respectively 100 Mbps, 90 Mbps, and 70 Mbps.

Figure 2:
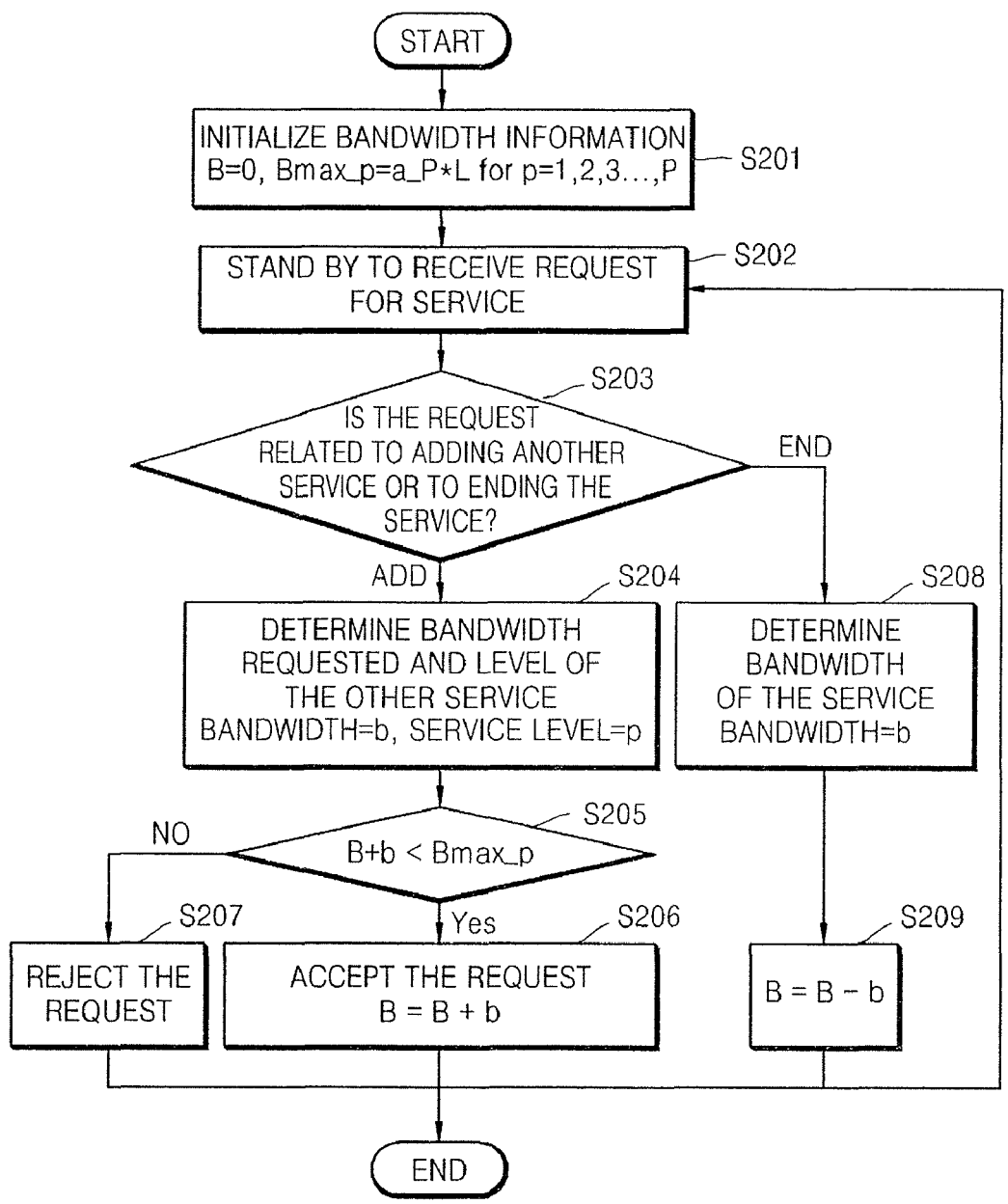
FIG. 2 is a flowchart schematically illustrating a process of accepting a request for network resources through a Transport Resource Control-Functional Entity (TRC-FE) according to an embodiment of the present invention.

FIG. 2 is a flowchart schematically illustrating a process of accepting a request for network resources through the TRC-FE according to an embodiment of the present invention. Bandwidth information is initialized in an initial system stage (operation S201). For example, a bandwidth B that is currently used and a maximum available bandwidth Bmax_p of each service level are initialized. In this case, a service level (priority) p has a value of 1, 2, 3, . . . , or P. The maximum available bandwidth Bmax_p is determined by a rate a_p of a maximum bandwidth L that can be physically used, e.g., a physical link capacity or a bandwidth allocated to a multiprotocol label switching (MPLS) tunnel. The ratio of the maximum available bandwidth of each service level Bmax_p may be adjusted using the rate a_p of the maximum bandwidth L.

Next, the TRC-FE stands by to receive a request for a service (operation S202). If a request for a service is received, it is determined whether the request is related to adding another service or to ending the service (operation S203).

If the request is related to adding another service, a bandwidth b that is requested and a level p of a media flow of the other service to be added are determined (operation S204).

Next, it is determined whether the sum of the bandwidth B that is currently used and the requested bandwidth b is less than the maximum bandwidth Bmax_p (operation S205). If the sum is less than the maximum bandwidth Bmax_p, the request for the other service is accepted (operation S206). If the sum is not less than the maximum bandwidth Bmax_p, the request for the other service is rejected (operation S207).

If the request is related to ending the service, the bandwidth b allocated to the service is inquired (operation S208) and the bandwidth b is subtracted from the bandwidth B that is currently used (operation S209). When the service ends, the level of the service does not need to be considered.

As described above, when whether to accept a request for a service is determined through the TRC-FE unit based on a bandwidth of the service, the determination is made by allocating a different reference value to each service level. Thus, it is possible to reject a low-priority service before a bandwidth available is exhausted and to accept a high-priority service to a maximum available bandwidth of the service level of the high-priority service, thereby increasing the admission rate of the high-priority service, compared to that of the low-priority service.

Service Downgrade Method

In the service downgrade method, it is possible to prevent a request for a high-priority service from being rejected due to a resource shortage by securing a surplus bandwidth by dynamically reducing network resources allocated to a low-priority service.

Figure 3:
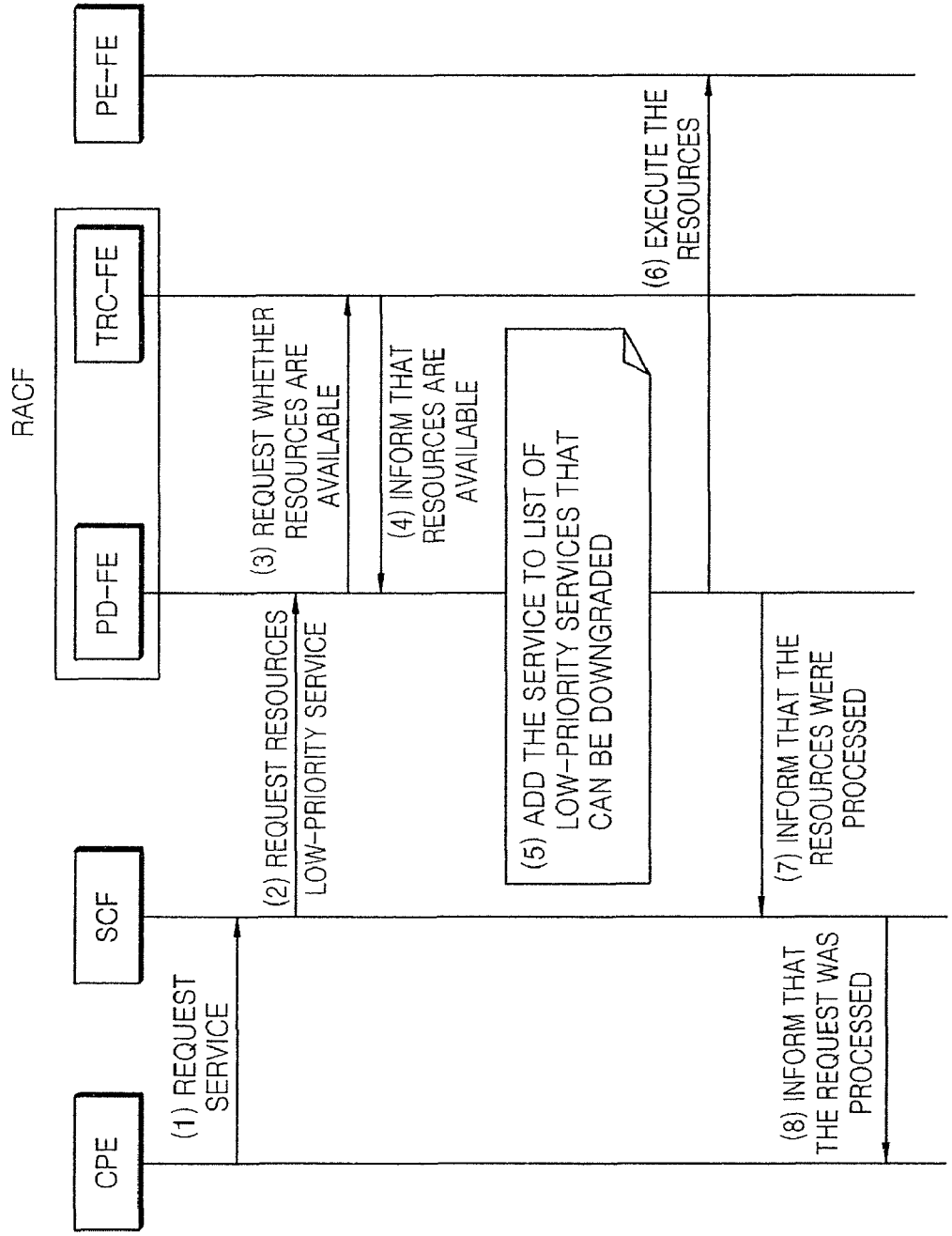
FIG. 3 is a flowchart schematically illustrating a process of accepting a request for a service by using a service downgrade method, according to an embodiment of the present invention.

FIG. 3 is a flowchart schematically illustrating a process of accepting a request for a service in the service downgrade method, according to an embodiment of the present invention. First, a user node customer premises equipment (CPE) delivers a request for a service to an SCF unit (operation 1).

Then, the SCF unit requests a PD-FE to provide network resources in order to connect a source node and a destination node, based on media flow information that includes the IP address and port number of each node and a bandwidth allocated in a media flow (operation 2). At this time, the SCF unit informs the PD-FE as to whether the requested service can be downgraded. In the current embodiment, the request service is a low-priority service and can be downgraded.

Next, the PD-FE inquires of a TRC-FE about whether the network resources are available, in response to the request from the SCF unit (operation 3), and the TRC-FE informs the PD-FE that the network resources are available (operation 4).

If a resource is available for setting up the service, the PD-FE adds the service to a list of low-priority services that can be downgraded (operation 5).

Next, the PD-FE requests a Policy Execution-Functional Entity (PE-FE), which is a boundary node, to execute the requested network resources so that the resources can be allocated in order to guarantee the QoS of the media flow (operation 6).

Next, the PD-FE informs the SCF unit that the request for resources were processed (operation 7), and the SCF unit informs the user node CPE that the request for the service was processed (operation 8).

In the above process of accepting a request for a service, as illustrated in FIG. 3, the SCF unit determines the priority allocated to the service and delivers the determination result to the PD-FE in operation 2, and the PD-FE manages a list of low-priority services that can be downgraded at a later time in operation 5.

Figure 4:
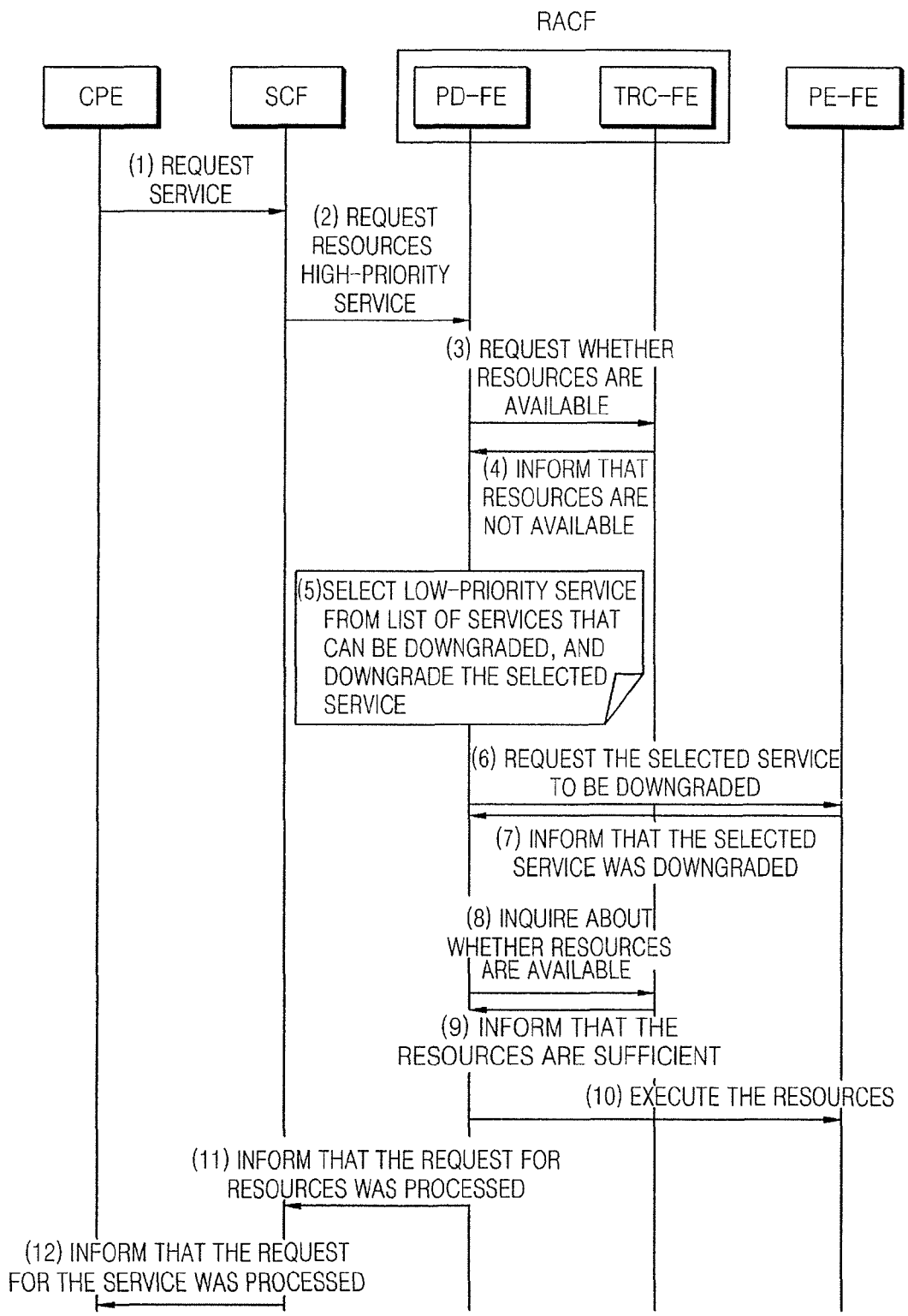
FIG. 4 is a flowchart schematically illustrating a process of downgrading a low-priority service in order to prevent a request for a high-priority service from being rejected due to a resource shortage according to an embodiment of the present invention.

FIG. 4 is a flowchart schematically illustrating a process of downgrading a low-priority service in order to prevent a request for a high-priority service from being rejected due to a resource shortage according to an embodiment of the present invention. First, a user node CPE delivers a request for a service to an SCF unit (operation 1).

The SCF unit requests a PD-FE to provide network resources for a media flow (operation 2). At this time, the SCF unit informs the PD-FE that the requested service is a high-priority service.

The PD-FE inquires of a TRC-FE about whether the network resources are available (operation 3). The TRC-FE determines whether the network resources are available and informs the PD-FE that the network resources are not available when the network resources are not sufficient (operation 4).

Then, the PD-FE determines that resources are not sufficient to be provided to the high-priority service, and begins to downgrade a low-priority service in order to accept the request for the high-priority service (operation 5). In this case, the PD-FE selects a service that is to be downgraded from a list of services that can be downgraded.

Next, the PD-FE requests a PE-FE, which is a boundary node, to downgrade the service selected in operation 5 (operation 6), and the PE-FE informs the PD-FE that a bandwidth allocated to the selected service is reduced (operation 7). Then, the PD-FE secures a bandwidth necessary to accept the request for the high-priority service.

After the downgrading of the selected service, it is determined whether the network resources for the high-priority service, which was requested in operation 2, are available. In detail, the PD-FE inquires of the TRC-FE about whether the network resources are available (operation 8), and the TRC-FE informs the PD-FE that the network sources are sufficient (operation 9).

The PD-FE requests the PE-FE to execute the requested resources so that the resources are allocated in order to guarantee the QoS of the media flow of the high-priority service (operation 10).

Then, the PD-FE informs the SCF unit that the request for the network resources was processed (operation 11), and the SCF unit informs the user node CPE that the request for the service was processed (operation 12). In operation 11, the SCF unit is also informed that the previously requested low-priority service was downgraded.

The process of FIG. 4 differs from the process of FIG. 3 in that operations 5 to 7 for service downgrading are further performed. If a request for a high-priority service cannot be accepted due to a resource shortage, the PD-FE selects at least one service from a list of accepted low-priority services that can be downgraded, and secures a bandwidth to accept the request for the high-priority service by reducing a bandwidth allocated to the at least one selected service. In this case, a service that is to be selected from the list of previously accepted low-priority services is determined according to the policies of a network service provider. For example, one service may be selected from the list of accepted low-priority services according to a service duration (e.g., in order of a longer duration or a shorter duration), a bandwidth required (e.g., in order of a large bandwidth for use), a random selection method or other conditions.

The service downgrade method may be applied to a scalable video coding (SVC) service. A network controller may reduce a bandwidth allocated to the SVC service when resources for the SVC service are requested and available resources are not sufficient. That is, the network controller may accept the request for the SVC service by changing video resolution of the SVC service from high resolution to low resolution according to network traffic conditions. When network resources are improved, the network controller may change the video resolution of the SVC service from low resolution to high resolution again by increasing the bandwidth allocated to the SVC service.

Also, if network resources become insufficient due to a request for a second video service whose priority is higher than that of a first video service during providing of the first video service, then the resolution of the first video service may be changed from high resolution to low resolution. When network resources are improved, the network controller may change the resolution of the first video service from low resolution to high resolution again.

Figure 5:
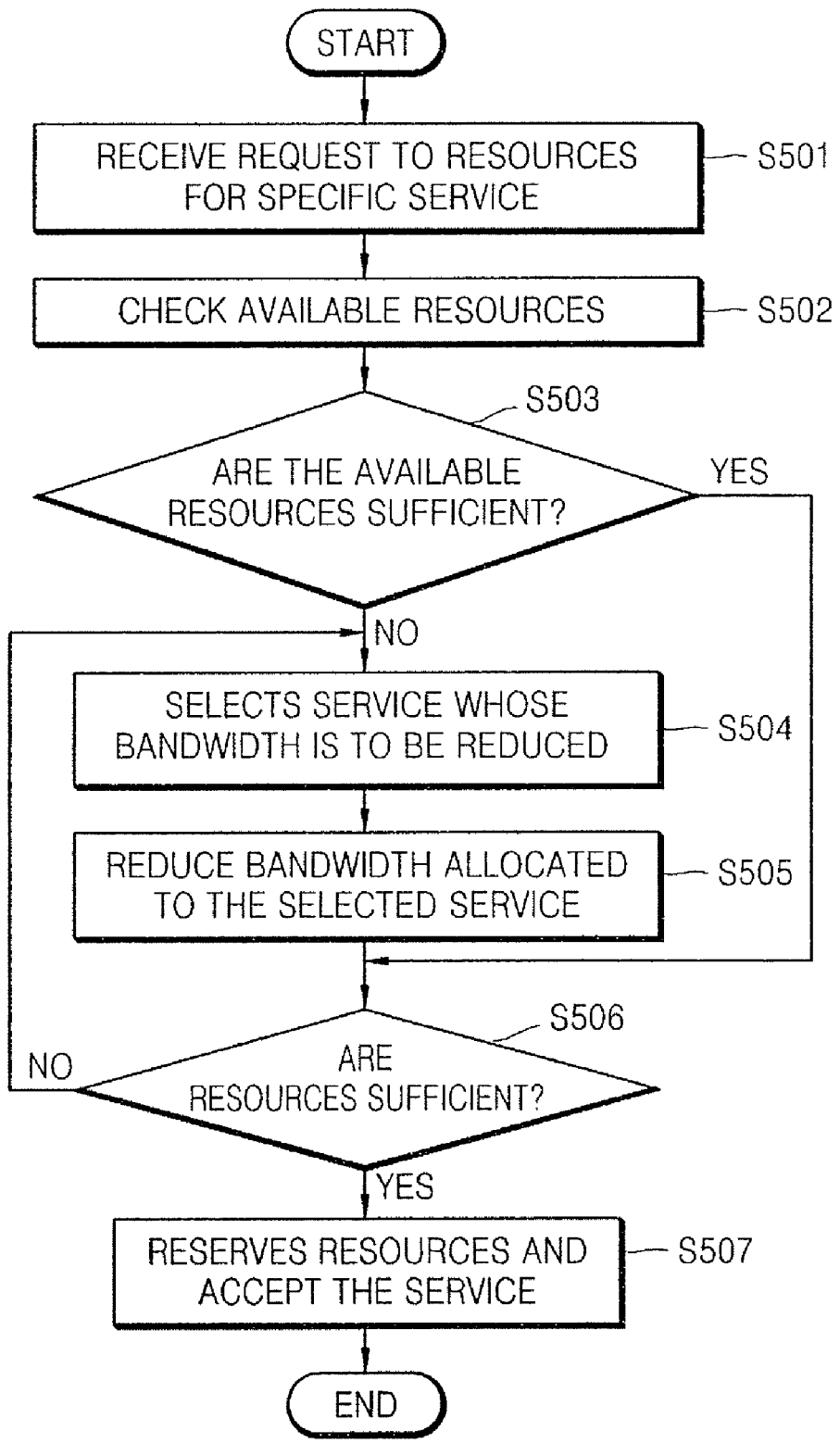
FIG. 5 is a flowchart schematically illustrating a method of allowing a resource admission control apparatus to downgrade a service according to an embodiment of the present invention.

FIG. 5 is a flowchart schematically illustrating a method of allowing a resource admission control apparatus to downgrade a service according to an embodiment of the present invention. The resource admission control apparatus which is a central network control apparatus receives a request to provide resources for a specific service (operation S501), and checks available resources (operation S502).

The resource admission control apparatus determines whether the available resources are sufficient based on the level of the specific service (operation S503).

If the available resources are insufficient, the resource admission control apparatus selects a service whose bandwidth is to be reduced from a list of services, the priority of which is lower than the priority allocated to the specific service (operation S504). Next, if the available resources exist, the resource admission control apparatus determines whether the available resources are sufficient to be allocated to the specific service (operation S506). If the available resources are sufficient, the request for the specific service is accepted (operation S507). The resource admission control apparatus adds the accepted service to the list of services, and manages the list of services that are categorized according to a service level.

After performing operation S504, the resource admission control apparatus reduces the bandwidth allocated to the selected low-priority service (operation S505), and then determines whether bandwidth resources for the specific service are sufficient (operation S506).

If it is determined in operation S506 that the bandwidth resources are sufficient, the resource admission control apparatus reserves the bandwidth resources and accepts the request for the specific service (operation S507). If it is determined in operation S506 that the bandwidth resources are not sufficient, the resource admission control apparatus repeatedly performs operations 504 to 506 until sufficient bandwidth resources are secured.

Figure 6:
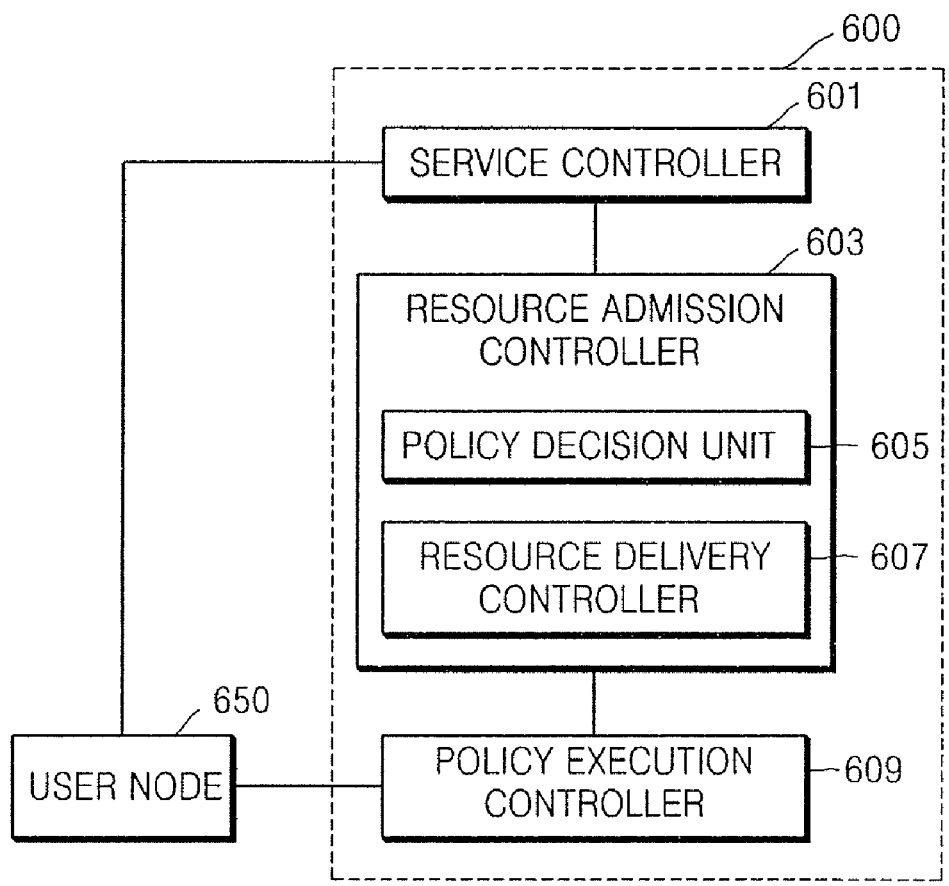
FIG. 6 is a block diagram schematically illustrating the internal construction of a resource control system according to an embodiment of the present invention.

FIG. 6 is a block diagram schematically illustrating the internal construction of a resource control system 600 according to an embodiment of the present invention. Referring to FIG. 6, the resource control system 600 includes a service controller 601, a resource admission controller 603, and a policy execution controller 609. The resource admission controller 603 includes a policy decision unit 605 and a resource delivery controller 607.

The service controller 601 receives a request for a specific service from a user node 650, requests the policy execution controller 603 to provide resources for the requested service, and provides the resource admission controller 603 with media information that includes QoS characteristics and a service priority (service level). When requesting the policy execution controller 603 to provide resources, the service controller 601 informs the policy decision unit 605 as to whether the bandwidth of the requested service can be reduced according to the level thereof.

The resource admission controller 603 receives the request for resources, and determines whether to accept the request for the specific service according to the level of the specific service in order to control the admission rate of the specific service. The policy decision unit 605 receives the request for the resources for the specific service and the media information from the service controller 601. The policy decision unit 605 determines a mode for accepting a service. The policy decision unit 605 may perform one selected from among a plurality of modes for accepting a service according to an embodiment of the present invention or a combination thereof.

In a preventive mode, the resource delivery controller 607 determines whether to accept a request for a specific service by performing bandwidth control based on a maximum bandwidth that has been determined according to a service level. The resource delivery controller 607 accepts the request for the specific service when the sum of a requested bandwidth for the specific service and a bandwidth that is currently used is less than the maximum bandwidth, and rejects the request for the specific service when the sum is not less than the maximum bandwidth. If the request for the specific service, which is received via policy decision unit 605, is related to ending the specific service, the resource delivery controller 607 subtracts the bandwidth allocated to the specific service from the bandwidth that is currently used.

In a service downgrade mode, the policy decision unit 605 requests the resource delivery controller 607 to check available resources, in response to a request for resources for a specific service. If the resource delivery controller 607 determines that available resources are not sufficient, the policy decision unit 605 secures a bandwidth for the specific service by reducing a bandwidth allocated to a service whose priority is lower than that of the specific service, and accepts the request for the specific service. The policy decision unit 605 may select a low-priority service, the bandwidth of which is to be reduced according to any one of a service duration, the length of an available bandwidth, and a random selection method, etc., but the present invention is not limited thereto. The policy decision unit 605 classifies and manages a plurality of accepted services according to a service level. The policy decision unit 605 checks information indicating whether a bandwidth allocated to the specific service can be reduced, and adds the specific service to a list of services that can be downgraded when the bandwidth allocated to the specific service can be reduced.

In the service downgrade mode, when the policy decision unit 605 selects a low-priority service whose bandwidth is to be reduced, the policy execution controller 609 reduces the bandwidth of the selected low-priority service. Also, the policy execution controller 609 allocates a bandwidth to an accepted high-priority service.

In another embodiment of the present invention, a processor/controller that is programmed according to computer software commands in order to perform the present invention may be replaced with hardware or a combination of the processor/controller and the hardware. Thus, the present invention is not limited to a particular combination of hardware and software.

As described above, the present invention provides a network resource control method for guaranteeing an admission rate of a high-priority service, which can be defined in various ways, to be higher than that of a low-priority service. It is possible to differentiate between a high-priority service and a low-priority service by using the preventive method or the service downgrade method, thereby increasing the admission rate of the high-priority service.

The present invention may be used in order to effectively provide not only an emergency service or a disaster service but also a differentiated service in an NGN. Accordingly, it is possible to derive various business models (BM) of the present invention.

In the case of media services that have been popularly used, scalable video coding (SVC) is commonly used to encode video traffics having various resolutions into a video stream. Thus, if a service downgrading method according to the present invention is applied to SVC-based multi-resolution traffic control, a video bandwidth may be allocated to a packe switches, such as an edge router, according to network circumstances and the router may control video resolution. Since SVC generates the media packets in multiple layers, it is possible for routers to change image resolution between high definition (HD) and standard definition (SD) by selectively delivering media packets.

The present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system.

The specific terms used in the present disclosure are not intended to restrict the scope of the present invention and are only used to facilitate a better understanding of the present invention.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. a network resource control method performed by a network controller comprising: receiving a request to allocate resources to a specific service checking a bandwidth requested for the specific service and a service level of the specific service; when the sum of the requested bandwidth and a bandwidth that is currently used is greater than a maximum bandwidth determined according to the service level of the specific service, reducing a bandwidth allocated to an existing service in order to secure a bandwidth to be allocated to the specific service, and accepting the request, where a priority of the existing service is lower than a priority of the specific service.

2. The method of claim 1, wherein the existing service whose bandwidth is to be reduced is selected according to one of a service duration, a length of the available bandwidth, and a random selection method.

3. The method of claim 1, further comprising classifying and managing accepted services into several groups according to a service level.

4. The method of claim 1, wherein the request to allocate resources to the specific service comprises information indicating whether the specific service is a low-priority service whose bandwidth is able to be reduced.

5. A network resource control method performed by a network controller comprising:
   receiving a request to allocate resources to a specific service and checking available resources; and
   controlling an admission rate of the specific service by determining whether to accept the specific service based on a service level of the specific service, wherein the controlling of the admission rate of the specific service comprises determining whether to accept the request according to one of a first resource control method and a second resource control method, where a high-priority service is first accepted by determining a maximum bandwidth determined according to each of a plurality of service levels in the first resource control method, and a high-priority service is accepted by securing a bandwidth to be allocated to the high-priority service by reducing a bandwidth allocated to a low-priority service in the second resource control method.

6. A network resource admission control apparatus comprising:
   a policy decision unit receiving a request to allocate resources to a specific service; and
   a resource delivery controller determining whether to accept the specific service by controlling a bandwidth based on a maximum bandwidth determined according to each of a plurality of service levels by applying a constant which is proportional to each service level to a total bandwidth available:
   Bmax p=a p*L, wherein
      Bmax p is the maximum available bandwidth;

p is the service level (priority) and has a value of 1, 2, 3, . . . , or P;

L is a maximum bandwidth; and a p is a rate of a maximum bandwidth L that can be physically used.

7. The apparatus of claim 6, wherein, if the sum of a bandwidth requested for the specific service and a bandwidth that is currently used is less than a maximum bandwidth determined according to a service level of the specific service, the resource delivery controller determines to accept the specific service.

8. The apparatus of claim 6, wherein, if the request received via the policy decision unit is related to ending the specific service, the resource delivery controller subtracts a bandwidth that is to be allocated to the specific service from a bandwidth that is currently used.

9. a network resource admission control apparatus comprising: a policy decision unit inquiring available resources in response to a request to allocate resources to a specific service, checking a bandwidth requested for the specific service and a service level of the specific service, when the sum of the requested bandwidth and a bandwidth that is currently used is greater than a maximum bandwidth determined according to the service level of the specific service, reducing a bandwidth allocated to an existing service in order to secure a bandwidth to be allocated to the specific service, and accepting the request, where a priority of the existing service is lower than a priority of the specific service; and a resource delivery controller determining whether the available resources are sufficient to be allocated to the specific service.

10. The apparatus of claim 9, wherein the policy decision unit selects a low-priority service whose bandwidth is to be reduced according to one of a service duration, a length of the available bandwidth, and a random selection method.

11. The apparatus of claim 9, wherein the policy decision unit classifies and manages accepted services according to a service level.

12. The apparatus of claim 9, wherein the request to allocate resources to the specific service comprises information indicating whether the specific service is a low-priority service whose bandwidth is able to be reduced.

13. A network resource control method performed by a network controller, the method comprising:

receiving a request for a scalable video coding (SVC) service;

checking a bandwidth requested for the SVC service and a service level of the SVC service; and when the sum of the requested bandwidth and a bandwidth that is currently used is greater than a maximum bandwidth determined according to the service level of the SVC service, changing the video resolution from high definition to low definition by reducing the bandwidth allocated to the SVC; and when the sum of the requested bandwidth and a bandwidth that is currently used is less than a maximum bandwidth determined according to the service level of the SVC service, changing the video resolution from low definition to high definition by increasing the bandwidth allocated to the SVC.

14. The method of claim 13, wherein the request to allocate resources to the specific SVC service comprises information indicating whether the specific SVC service is a low-priority service whose bandwidth is able to be reduced.

* * * * *